United States Patent
Vladimirovich et al.

(10) Patent No.: US 8,104,897 B2
(45) Date of Patent: Jan. 31, 2012

(54) PROJECTION OPTICAL SYSTEM HAVING AN ANGLED OPITCAL PART AND AN OFFSET OPTICAL PART

(75) Inventors: Bratishchev Alexey Vladimirovich, Moscow (RU); Sergievskaya Irina Vladimirovna, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 12/186,763

(22) Filed: Aug. 6, 2008

(65) Prior Publication Data
US 2009/0219490 A1 Sep. 3, 2009

(30) Foreign Application Priority Data
Feb. 29, 2008 (KR) .................. 10-2008-0019319

(51) Int. Cl.
*G03B 21/26* (2006.01)
*G03B 21/28* (2006.01)
(52) U.S. Cl. ............................. 353/33; 353/98
(58) Field of Classification Search ............... 353/30, 353/33, 81, 98
See application file for complete search history.

(56) References Cited

U.S. PATENT DOCUMENTS

| 5,245,369 | A | 9/1993 | Um et al. |
| 6,439,726 | B1 | 8/2002 | Piehler |
| 7,020,379 | B2* | 3/2006 | Lee .................................. 385/39 |
| 7,128,425 | B2* | 10/2006 | Kumai .......................... 353/119 |
| 7,159,989 | B2* | 1/2007 | Yano ............................... 353/81 |
| 2006/0285079 | A1* | 12/2006 | Wada .............................. 353/46 |
| 2007/0182937 | A1* | 8/2007 | Cheng et al. ..................... 353/74 |
| 2009/0009730 | A1* | 1/2009 | Destain ........................... 353/84 |

FOREIGN PATENT DOCUMENTS

| EP | 1434078 A1 | 6/2004 |
| JP | 2000-321529 A | 11/2000 |
| JP | 2002-521704 A | 7/2002 |
| JP | 2005-12303 A | 1/2005 |
| JP | 2005-92206 A | 4/2005 |
| JP | 2006-106189 A | 4/2006 |
| WO | 00/04710 | 1/2000 |

OTHER PUBLICATIONS

Communication dated Nov. 29, 2011, issued by the European Patent Office in counterpart European Application No. 08159465.7.

* cited by examiner

*Primary Examiner* — Thanx X Luu
(74) *Attorney, Agent, or Firm* — Sughrue Mion, PLLC

(57) ABSTRACT

Provided is a projection optical system which includes a first optical part which projects an image; a second optical part having an image forming device, which forms an image using a light and emits the image to the first optical part; a third optical part having at least one light source which emits the light; and a deflector which guides the light emitted from the third optical part toward the second optical part, wherein an optical axis of the third optical part is angled toward an optical axis of the second optical part, and an optical axis of the first optical part and the optical axis of the second optical part are parallel to each other and separated from each other.

11 Claims, 2 Drawing Sheets

PROJECTION OPTICAL SYSTEM HAVING AN ANGLED OPITCAL PART AND AN OFFSET OPTICAL PART

CROSS-REFERENCE TO RELATED PATENT APPLICATION

This application claims priority from Korean Patent Application No. 10-2008-0019319, filed on Feb. 29, 2008, in the Korean Intellectual Property Office, the disclosure of which is incorporated herein in its entirety by reference.

BACKGROUND OF THE INVENTION

1. Field of the Invention

Apparatuses and methods consistent with the present invention relate to an optical system, and more particularly, to a projection optical system which can be used to generate and project an image.

2. Description of the Related Art

In a projection optical system, a light generated by a light source is condensed, by a condensing lens providing homogeneous illumination, on a film and then is projected onto a screen via a lens. In order to form an image, a recent projection optical system (disclosed in Japanese Patent No. 2000-321529, and Japanese Patent No. 2005-092206) does not use the film but uses micromirror devices, such as a digital micromirror device (DMD), which are composed of a set of rotary mirrors. Such a projection optical system includes an illuminating optics such as the set of rotary mirrors for achieving the homogeneous illumination, and a projecting optics such as the lens for projecting the image onto the screen.

However, the projection optical system is disadvantageous in that, due to a relatively long travel distance of light within the projection optical system, a considerable loss of light occurs, and this requires an increase in optical power which may excessively heat the projection optical system. In order to prevent such excessive heat, the overall size of the projection optical system needs to be increased.

According to a projection system disclosed in U.S. Pat. No. 6,439,726, an illuminating optics and a projecting optics of the projection system are divided into first, second and third optical parts. The first and second optical parts have a common optical axis and together compose a projection lens. The second and third optical parts together compose the illuminating optics. An auxiliary illumination light, such as a backlight, is emitted from the third optical part, is illuminated on the second optical part including a micromirror device, forms an image pattern, is emitted from the projection system and then is projected onto the screen after having passed through the first optical part. At this time, by installing the third optical part at an angle to the first and second parts, an optical trajectory of the light, that is, a distance between a light source and the micromirror device is shortened so that loss of light is reduced and the required optical power is reduced. Accordingly, the size of the projection system can be reduced.

However, such a projection system has the following disadvantages. In general, a compact projection system uses a light source, such as a gas-discharge lamp or a light emitting diode, which has great divergence. At this time, the light efficiency of a device, the overall size of the device, and image quality are important features. The higher requirements to the light efficiency along with application of high-aperture light sources necessitate great numerical aperture of the illuminating light beam falling on the micromirror plate and the great numerical aperture of the projection lens. Thus, an aperture diaphragm of the second optical part, wherein the aperture diaphragm is located between the first optical part and the second optical part, represents a pupil plane with respect to both the illumination light and a projection beam. A beam splitting in the pupil plane (with the numerical aperture that is equal to, or that exceeds, sinus of an inclination angle of the micromirror plate) or in its vicinity, minimizes and uniformizes beam vignetting. An acceptable distance depends on the numerical aperture of the lens, that is, the smaller the numerical aperture is, the further displacement of the beam splitting node from the pupil is possible). In general, such a distance does not exceed a diameter of the pupil. For efficient separation of an illumination part and a projecting part, an aberration in the pupil is also important. In other words, coincidence of the position and the size of the pupil for all points of the field are important. Also, pupil quality is important not only for the projecting part, but also for the illuminating part. In the case where the illuminating part has great pupil aberrations, the projection system demonstrates heterogeneity of vignetting across an image area (field), and increase in an ambient light component, such that optical devices overheat and image quality deteriorates. Thus, in order to achieve a uniform brightness and generate a high-quality image in the compact projection system, correction of the pupil of the second optical part is necessary for both the projection beam and an illumination beam. By doing so, an adjustable numerical aperture of the second optical part is increased. In this case, an applied aperture is asymmetric with respect to the second optical part when the illumination beam reaches the second optical part at a great angle. On the other hand, the projection beam generally propagates symmetrically or almost symmetrically along an optical axis.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention to provide a digital TV and a digital broadcasting system capable of actively controlling an application function with efficient use of a limited number of keys when operating an application program provided by a base broadcasting station by inputting a combination of suitable keys corresponding to the concerned application program, thereby controlling the application function, and a control method thereof.

The present invention provides a projection system which has a reduced size and is easy to manufacture by simplifying a structure of a second optical part.

According to an aspect of the present invention, there is provided a projection optical system including a first optical part which projects an incident image; a second optical part including an image forming device which forms an image using a light, and emits the image to the first optical part; a third optical part including at least one light source, which emits the light; and a deflector which guides the light emitted from the third optical part toward the second optical part, wherein an optical axis of the third optical part is angled toward an optical axis of the second optical part, and an optical axis of the first optical part and the optical axis of the second optical part are parallel to each other and separated from each other.

An angle formed between the optical axis of the third optical part and the optical axis of the second optical part may be between 0° and 90°.

A distance between the optical axis of the first optical part and the optical axis of the second optical part may be between 2% and 50% of an incident pupil diameter of the second optical part.

The deflector may be one of a mirror, a prism, and an apparatus including both the mirror and the prism.

The image forming device may be a reflective-type image forming device.

The reflective-type image forming device may be one of a digital micromirror device (DMD) and a liquid crystal on silicon (LCOS).

The first optical part includes a first meniscus lens having a first concave side, which faces the second optical part; a second meniscus lens having a second concave side, which faces the second optical part; a first positive lens; a third meniscus lens having a third concave side, which faces the second optical part; a negative lens; and a second positive lens.

The second optical part includes a third positive lens; and a cemented lens formed by gluing three lenses.

A first cross-point, which is between the optical axis of the first optical part and a pupil plane of the second optical part, may be located at a position that is distant from a second cross-point, which is where the optical axis of the second optical part meets the pupil plane of the second optical part, by as much as 0.3 through 3.0 mm.

The third optical part may include a plurality of monochromatic light sources; a color composition device which combines a light beam from the plurality of monochromatic light sources; and a lens unit which adjusts a numerical aperture and a shape of the light beam combined by the color composition device.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
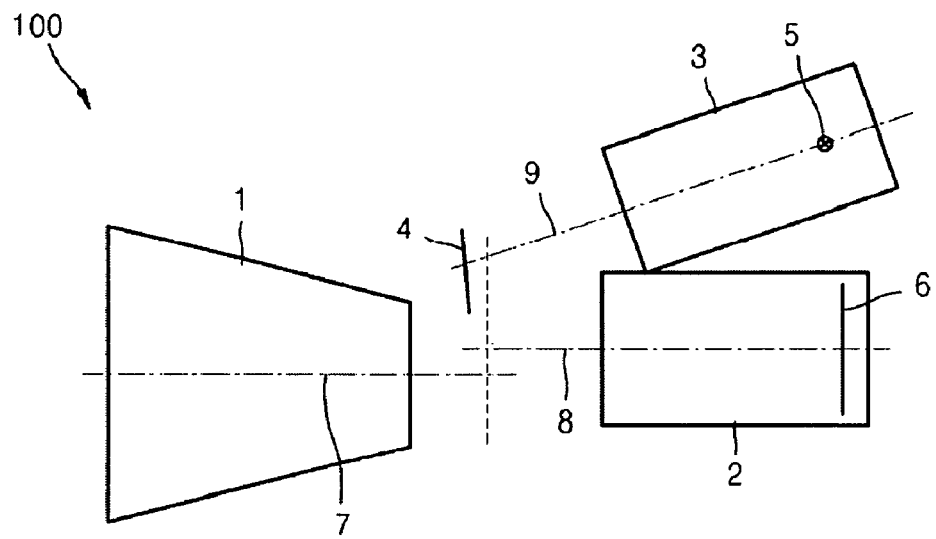
FIG. 1 is a diagram of a projection optical system according to an exemplary embodiment of the present invention.

The present invention will now be described more fully with reference to the accompanying drawings, in which exemplary embodiments of the invention are shown. Like reference numerals in the drawings denote like elements. In the drawings, a size of each component can be exaggerated for clarity.

FIG. 1 is a diagram of a projection optical system 100 according to an exemplary embodiment of the present invention. The projection optical system 100 includes a first optical part 1, a second optical part 2, a third optical part 3, and a deflector 4.

The first optical part 1 includes at least one optical device so as to project an incident image.

The second optical part 2 forms an image by using an incident light, and emits the formed image to the first optical part 1. The second optical part 2 includes a reflective-type image forming device 6.

The third optical part 3 includes at least one light source 5, forms and emits a light.

The deflector 4 changes a light path so that the light emitted from the third optical part 3 is toward the second optical part 2. For example, the deflector 4 may be formed of one of an apparatus including a mirror, an apparatus including a prism, and an apparatus including both a mirror and prism.

The first optical part 1 and the second optical part 2 together compose a projection optics by which the image, which is presented on a reflective surface of the reflective-type image forming device 6, is displayed on a screen (not shown). The second optical part 2 guides the light from the light source 5, wherein the light is formed by the third optical part 3 and redirected by the deflector 4.

Here, a pupil plane of the second optical part 2 is located between the first optical part 1 and the second optical part 2. The first optical part 1, the second optical part 2, and the third optical part 3 respectively have optical axes 7, 8, and 9. The optical axis 9 of the third optical part 3 is angled toward the optical axis 8 of the second optical part 2. For example, the optical axis 9 and the optical axis 8 form an angle between 0° and 90°.

The optical axis 7 of the first optical part 1 and the optical axis 8 of the second optical part 2 are parallel to each other, and are separated from each other. As illustrated in FIG. 1, the optical axis 8 of the second optical part 2 is parallel to the optical axis 7 of the first optical part 1, and a distance between the optical axis 8 and the optical axis 7 in a surface passing through the optical axis 7 of the first optical part 1 does not exceed a pupil radius of the second optical part 2 for a projection beam. For example, the distance between the optical axis 8 and the optical axis 7 may be between 2% and 50% of an incident pupil diameter of the second optical part 2 for the projection beam. This value range is selected based on the following reasons. When de-centering occurs, that is, when the distance between the optical axis 8 of the second optical part 2 and the optical axis 7 of the first optical part 1 is smaller than 2% of the incident pupil diameter, a positive effect for reducing the size of the projection optical system 100 having an effective vision field becomes negligible. Also, when the distance exceeds 50% of the incident pupil diameter, aberrations may not actually be compensated for.

A first cross-point, which is between the optical axis 7 of the first optical part 1 and the pupil plane of the second optical part 2, may be located at a position that is distant from a second cross-point, which is where the optical axis 8 of the second optical part 2 meets the pupil plane of the second optical part, by as much as 0.3 through 3.0 mm.

In general, the projection optical system 100 is structured such that the third optical part 3 forms a cone shaped light by using the light from the light source 5, and guides the cone shaped light to the deflector 4. The deflector 4 guides the cone shaped light formed by the third optical part 3 to the second optical part 2. The light, which has passed through the second optical part 2 in one direction, is reflected from the reflective-type image forming device 6. Here, the reflective-type image forming device 6 forms the image by using the incident light. Next, the light, which was formed to the image, passes through the second optical part 2 in an opposite direction, and reaches an entrance of the first optical part 1. The first optical part 1 projects the incident image onto the screen (not shown).

As described above, the first optical part 1 and the second optical part 2 are arranged in such a manner that the optical axis 8 of the second optical parts 2 is parallel to the optical axis 7 of the first optical part 1, and the first optical part 1 and the second optical part 2 are separated from each other by a distance not exceeding half a pupil diameter of the second optical part 2 with respect to the projection beam. By doing so, the projection optical system 100 having a numerical aperture of more than 0.1 is provided.

The projection optical system 100 according to an aspect of the present invention partially performs centering for a space in the pupil plane so as to simplify a structure of the second optical part 2 so that an adjustable numerical aperture of the second optical part 2 may be reduced.

Figure 2:
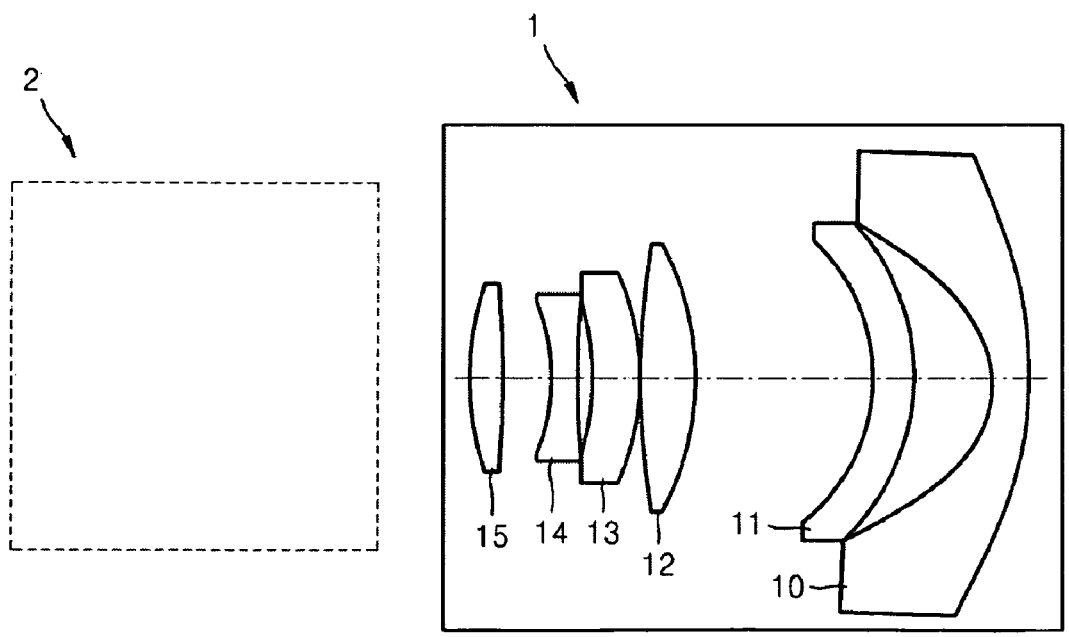
FIGS. 2 and 3 are diagrams of first and second optical parts of the projection optical system in FIG. 1.
Figure 3:
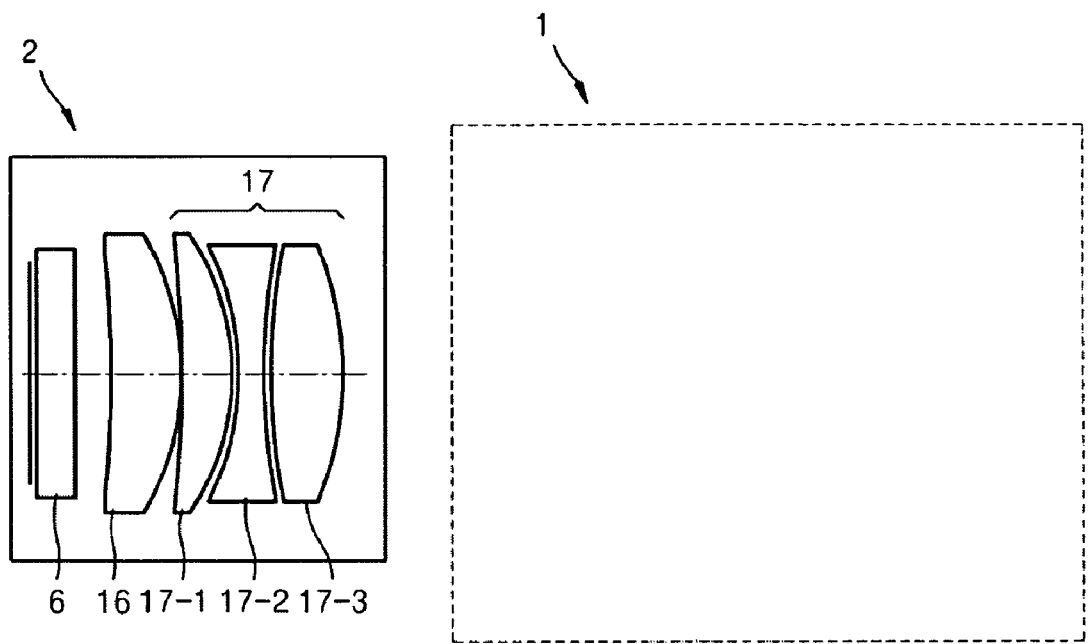

FIGS. 2 and 3 are diagrams of the first and second optical parts 1 and 2 of the projection optical system 100 in FIG. 1. Referring to FIGS. 2 and 3, the first optical part 1 is sequentially arranged toward the second optical part 2. The first optical part 1 includes a first meniscus lens 10 facing the second optical part 2 with its concave side, a second meniscus lens 11 facing the second optical part 2 with its concave side, a first positive lens 12, a third meniscus lens 13 facing the second optical part 2 with its concave side, a negative lens 14, and a second positive lens 15. The second optical part 2 includes the reflective-type image forming device 6, a third positive lens 16, and a cemented lens 17 formed by gluing three lenses 17-1, 17-2, and 17-3. The third positive lens 16 and the cemented lens 17 are sequentially arranged from a surface of the reflective-type image forming device 6 toward the first optical part 1. For example, a digital micromirror device (DMD), or liquid crystal on silicon (LCOS) that is a reflective-type liquid crystal display (LCD) may be employed for the reflective-type image forming device 6.

Figure 4:
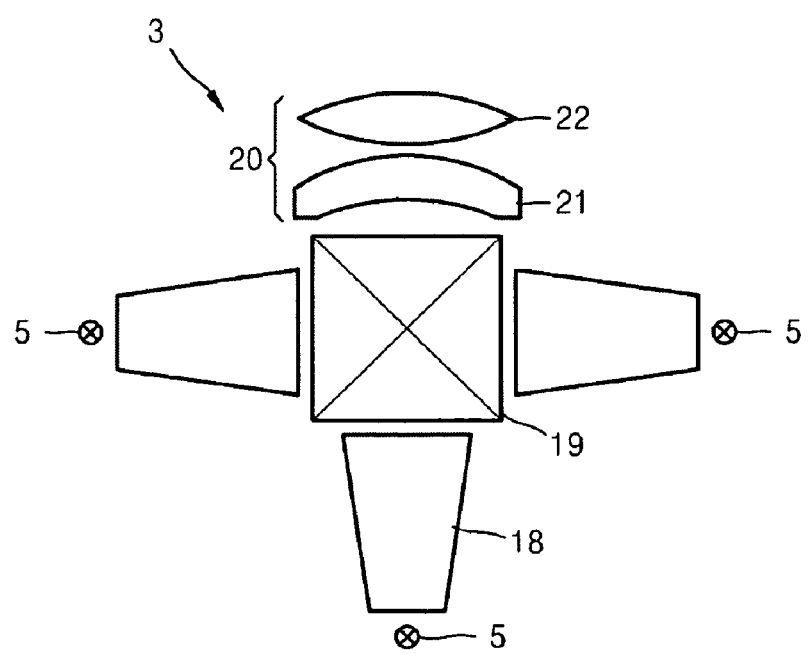
FIG. 4 is a diagram of a third optical part of the projection optical system in FIG. 1.

FIG. 4 is a diagram of the third optical part 3 of the projection optical system 100 in FIG. 1. The third optical part 3 includes a plurality of monochromatic light sources 5, a color composition device 19 which combines lights from the plurality of monochromatic light sources 5, and a lens unit 20 which adjusts a numerical aperture and a shape of a light beam combined by the color composition device 19.

Each of the plurality of monochromatic light sources 5 may be a red light source, a green light source, and a blue light source. The color composition device 19 may be an X-cube used for splitting or combining of beams. Each of the plurality of monochromatic light sources 5 is disposed to face each surface of the color composition device 19.

The lens unit 20 adjusts the light beam combined and transmitted by the color composition device 19 so as to have a shape and numerical aperture requested by the projection optical system 100. The lens unit 20 may include a fourth meniscus lens 21 facing the color composition device 19 by its concave side, and a fourth positive lens 22.

A light condenser 18 may be arranged between the color composition device 19 and each of the plurality of monochromatic light sources 5. The light condenser 18 is an optical element which reduces angular divergence of radiation from the plurality of monochromatic light sources 5, and uniformly condenses the light beam. For example, a compound parabolic concentrator such as a Winston concentrator or a focon may be employed as the light condenser 18. A relatively wider surface of the light condenser 18 is disposed so as to face each of the plurality of monochromatic light sources 5.

An aspect of the present invention has been described herein using a case having three colored (red, green, and blue) light sources, but the present invention is not limited thereto.

The aforementioned lenses of the projection optical system according to the present invention can be manufactured using glass or a plastic. The manufacturing of the lenses may be possible by using a related art method.

The projection optical system according to the present invention can be applied to all types of projectors, projection television (TV) receivers, displays and other devices using front or rear projection in which compactness and a high optical efficiency are required.

While the present invention has been particularly shown and described with reference to exemplary embodiments thereof, it will be understood by those of ordinary skill in the art that various changes in form and details may be made therein without departing from the spirit and scope of the present invention as defined by the appended claims. The exemplary embodiments should be considered in a descriptive sense only and not for purposes of limitation. Therefore, the scope of the present invention is defined not by the detailed description of the present invention but by the appended claims, and all differences within the scope will be construed as being included in the present invention.

What is claimed is:

1. A projection optical system comprising:
   a first optical part which projects an incident image;
   a second optical part including an image forming device which forms an image using a light and emits the image to the first optical part;
   a third optical part including at least one light source which emits the light; and
   a deflector which guides the light emitted from the third optical part toward the second optical part,
   wherein an optical axis of the third optical part is angled toward an optical axis of the second optical part, and an optical axis of the first optical part and the optical axis of the second optical part are parallel to each other and separated from each other,
   wherein the optical axes of the first, second and third optical parts extend along respective paths of the light from the first, second and third optical parts,
   wherein a distance between the optical axis of the first optical part and the optical axis of the second optical part is between 2% and 50% of an incident pupil diameter of the second optical part, and
   wherein the optical axis of the third optical part extends through the first optical part.

2. The projection optical system of claim 1, wherein an angle formed between the optical axis of the third optical part and the optical axis of the second optical part is between 0° and 90°.

3. The projection optical system of claim 1, wherein the deflector is one of a mirror, a prism, and an apparatus including both the mirror and the prism.

4. The projection optical system of claim 1, wherein the image forming device is a reflective-type image forming device.

5. The projection optical system of claim 4, wherein the reflective-type image forming device is one of a digital micromirror device (DMD) and a liquid crystal on silicon (LCOS).

6. The projection optical system of claim 1, wherein the first optical part includes:
   a first meniscus lens having a first concave side which faces the second optical part;
   a second meniscus lens having a second concave side which faces the second optical part;
   a first positive lens;
   a third meniscus lens having a third concave side which faces the second optical part;
   a negative lens; and
   a second positive lens,
   wherein the first meniscus lens, the second meniscus lens, the first positive lens, the third meniscus lens, the negative lens and the second positive lens are sequentially arranged in a direction toward the second optical part.

7. The projection optical system of claim 1, the second optical part includes:
   a positive lens; and a cemented lens formed by gluing three lenses,
wherein the positive lens and the cemented lens are sequentially arranged in a direction toward the first optical part.

8. The projection optical system of claim 1, wherein a pupil plane of the second optical part is located between the first optical part and the second optical part, and wherein a first cross-point, which is between the optical axis of the first optical part and the pupil plane of the second optical part, is located at a position that is distant from a second cross-point, which is where the optical axis of the second optical part meets the pupil plane of the second optical part, by as much as 0.3 through 3.0 mm.

9. The projection optical system of claim 1, wherein the third optical part includes:
a plurality of monochromatic light sources;
a color composition device which combines a light beam from the plurality of monochromatic light sources; and
a lens unit which adjusts a numerical aperture and a shape of the light beam combined by the color composition device.

10. The projection optical system of claim 9, wherein the color composition device is an X-cube, each of the plurality of monochromatic light sources faces each surface of the X-cube, and a light condenser is arranged between the X-cube and each of the plurality of monochromatic light sources.

11. The projection optical system of claim 9, wherein the lens unit includes a meniscus lens having a concave side facing the color composition device, and a positive lens.

* * * * *